 2,970,040
Patented Jan. 31, 1961

2,970,040
PURIFICATION OF SILICON HALIDES

John B. Conn, Westfield, N.J., assignor to Merck & Co., Inc., Rahway, N.J., a corporation of New Jersey No Drawing. Filed Mar. 7, 1958, Ser. No. 719,751

6 Claims. (Cl. 23—205)

This invention relates to the preparation of pure silicon, and, more particularly, to novel methods for removing trace impurities of boron, and other metals such as titanium, vanadium, iron and copper.

Silicon must be of the highest purity for the most sensitive electron uses. It is well-known that the presence of even trace amounts of impurities in silicon proves detrimental for semi-conductor and transistor requirements. It is the high purity of the silicon that makes possible rectifiers with higher power ratings and higher breakdown voltages, as well as higher power transistors.

One of the most difficult problems in preparing a high purity silicon is boron contamination. Boron cannot be removed from solid silicon by such known purification processes as zone refining and repeated crystal pulling, because boron is almost equally soluble in molten and solid silicon.

It is an object of this invention to provide silicon halide which can be converted to 1,000-ohm-cm.-grade silicon with a boron content of less than 0.3 part per million.

It is a further object of this invention to provide a method for reducing the boron level in silicon by removing the boron from a silicon halide and once the silicon halide is purified to the desired boron level, it is a relatively conventional step to obtain pure silicon.

It is a further object of this invention to provide an improved process for the production of pure silicon halide free from boron such that the boron is bound in a non-volatile form from which the volatile silicon halide can be readily removed.

The process of the present invention in its broader aspects involves contacting a silicon halide containing traces of boron and other metallic impurities such as titanium, vanadium, iron and copper with a dinitrile compound which may be represented by the formula—

NC—R—CN wherein R is an aliphatic or aromatic divalent group and recovering silicon halide substantially free of boron and other metallic impurities.

This invention is applicable to the silicon halides, generally provided that where the silicon halide is liquid, the boiling point of the silicon halide is below the boiling point of the dinitrile compound and provided that where the silicon halide is solid, the melting point of the solid silicon halide be below the boiling point of the dinitrile compound. Some of the silicon halides which might be employed in this reaction include silicon tetrachloride, disilicon hexachloride, and the like. Silicon tetrachloride is preferred for obvious commercial reasons.

The dinitrile compounds which may be employed in this process for removal of boron from silicon halides include any of the higher boiling dicyano compounds in which the silicon halide is insoluble such as the aliphatic dinitriles, malonitrile, succinonitrile, glutaronitrile, adiponitrile and pimelonitrile and such aromatic dinitriles as those of phthalic, isophthalic and terephthalic acids.

In accordance with one embodiment of this invention, commercial silicon tetrachloride containing trace amounts of contaminating compounds is added to a dinitrile compound such as succinonitrile. The resulting mixture is agitated at room temperature and then the silicon tetrachloride and succinonitrile layers are allowed to separate. A purified silicon tetrachloride containing none of the trace amounts of contaminating compounds is recovered. The impurities are found in the dinitrile phase. In the event that all of the impurities are not removed from the silicon tetrachloride in the first extraction the procedure can be repeated.

Under certain circumstances, it may be more expedient to distill the reactants rather than employ the above extraction procedure. In accordance with this procedure, commercial silicon tetrachloride containing traces of boron, titanium, vanadium, iron and copper is contacted with a dinitrile compound and the mixture distilled. The distillate is substantially pure silicon tetrachloride. The boron, titanium, vanadium, iron and copper are retained in the residue.

In place of the extraction or distillation procedures discussed above the purification can be carried out in columns. For example, the silicon tetrachloride can be distilled through a column packed with the dinitrile compound absorbed upon some suitable inert support such as porous alumina. The boron is complexed with the dinitrile compound and retained in the column and the purified silicon tetrachloride is recovered from the column.

The proportion of the reactants, silicon halide and the dinitrile compound is dependent upon the particular procedure employed. It is evident that where an extraction process is employed more dinitrile compound might be required than in a distillation or column-wise procedure. The amount of dinitrile compound is that quantity required to remove all of the impurities.

The following examples are to be understood as illustrative only and are in no way to be construed as limiting the invention.

Example 1

*Distillation procedure.*—To one liter of silicon tetrachloride, commercial grade containing boron, titanium, vanadium, iron and copper as impurities, was added 3 g. of succinonitrile and the mixture distilled until the pot residue was reduced to about 50 g.

A spectrographic check showed no detectable impurities in the distillate of silicon tetrachloride, but the residue contained considerable boron, together with titanium, vanadium, iron and copper.

Example 2

*Extraction procedure.*—50 g. of silicon tetrachloride containing between 0.25–1.0% boron trichloride was stirred at room temperature with 5 g. of succinonitrile and samples of the silicon tetrachloride phase were removed at intervals for colorimetric boron assay. Equilibrium was established within 15 minutes and the silicon tetrachloride phase contained 0.8 part per million of boron.

Example 3

*Extraction procedure.*—50 g. of silicon tetrachloride containing between 0.25–1.0% boron trichloride was stirred at room temperature with 5 g. of adiponitrile and samples of the silicon tetrachloride phase were removed at intervals for colorimetric boron assay. Equilibrium was established within 15 minutes and the silicon tetrachloride phase contained 2.5 parts per million of boron.

Example 4

*Extraction procedure.*—50 g. of silicon tetrachloride containing between 0.25–1.0% boron trichloride was stirred at room temperature with 5 g. of acetonitrile and samples of the silicon tetrachloride phase were removed at intervals for colorimetric boron assay. Equilibrium was established within 15 minutes and the silicon tetrachloride phase contained 15 parts per million of boron.

Comparison of the results obtained in Examples 2 and 4 indicate that succinonitrile is approximately 19 times as effective as acetonitrile in removing boron impurities from silicon tetrachloride by extraction at room temperature. It is also evident from Example 3 that adiponitrile is about 6 times as effective as acetonitrile in the removal of boron from silicon tetrachloride.

It is doubtful that the difference in boron content found in Example 2 (the succinonitrile) and Example 3 (adiponitrile) is significant since emulsification could account for this difference.

*Example 5*

*Column-wise procedure.*—A column was filled with 20 g. of succinonitrile on 280 g. of aluminum oxide carrier. The commercial grade silicon tetrachloride vapors, contaminated with boron, vanadium, iron and copper was passed through the succinonitrile column. The silicon tetrachloride vapors were condensed.

Chemical analysis showed the silicon tetrachloride distillate to be free of any detectable boron. The chemical detection limit is 0.3 part per million of boron.

It should be understood that various changes may be made in our process as herein described without affecting the results attained. Thus, various modifications of conditions as to time, temperature, alkalinity, acidity, etc. and various changes in procedure differing from those herein given as illustrative of the preferred embodiments of our invention may be made without departing from the scope thereof. Accordingly, the scope of our invention is to be determined in accordance with the prior art and appended claims.

We claim:
1. A process for purifying a silicon halide containing trace amounts of contaminating compounds which comprises contacting said silicon halide with a dinitrile compound of the formula—

$$NC-R-CN$$

wherein R is selected from the group consisting of aliphatic and aromatic divalent groups and separating substantially pure silicon halide from said dinitrile compound containing said contaminating compounds.

2. A process for purifying a silicon halide containing trace amounts of contaminating compounds which comprises contacting said halide with succinonitrile and separating substantially pure silicon halide.

3. A process for purifying a silicon halide containing trace amounts of contaminating compounds which comprises contacting said halide with glutaronitrile and separating substantially pure silicon halide.

4. A process for purifying a silicon halide containing trace amounts of contaminating compounds which comprises contacting said halide with adiponitrile and separating substantially pure silicon halide.

5. A process for purifying a silicon halide containing trace amounts of contaminating compounds which comprises contacting said halide with pimelonitrile and separating substantially pure silicon halide.

6. A process for purifying a silicon halide containing trace amounts of contaminating compounds which comprises contacting said halide with phthalonitrile and separating substantially pure silicon halide.

References Cited in the file of this patent
UNITED STATES PATENTS 2,857,249   Wolff _____ Oct. 21, 1958

FOREIGN PATENTS 656,098   Great Britain _____ Aug. 15, 1951